(12) United States Patent
White (10) Patent No.: US 9,036,481 B1
(45) Date of Patent: May 19, 2015

(54) METHOD AND APPARATUS FOR ADAPTIVE PACKET LOAD BALANCING

(75) Inventor: Martin White, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 75 days.

(21) Appl. No.: 13/088,724

(22) Filed: Apr. 18, 2011

Related U.S. Application Data

(60) Provisional application No. 61/331,530, filed on May 5, 2010.

(51) Int. Cl.
*H04L 12/56* (2006.01)
*H04L 12/801* (2013.01)

(52) U.S. Cl.
CPC .............. *H04L 47/11* (2013.01); *H04L 47/18* (2013.01)

(58) Field of Classification Search
CPC ...................................................... H04L 47/11
USPC ......... 370/229, 396, 237, 232, 235, 255, 230, 370/389
See application file for complete search history.

(56) References Cited

U.S. PATENT DOCUMENTS

| | | | | |
|---|---|---|---|---|
| 6,678,244 B1* | 1/2004 | Appanna et al. | ............... | 370/229 |
| 7,046,680 B1* | 5/2006 | McDysan et al. | ............. | 370/396 |
| 7,613,116 B1* | 11/2009 | Medina | ......................... | 370/235 |
| 7,917,624 B2* | 3/2011 | Gidwani | ....................... | 709/226 |
| 8,208,406 B1* | 6/2012 | Jiang et al. | ..................... | 370/255 |
| 2006/0023705 A1* | 2/2006 | Zoranovic et al. | ............ | 370/389 |
| 2007/0047446 A1* | 3/2007 | Dalal et al. | ..................... | 370/237 |
| 2008/0062891 A1* | 3/2008 | Van der Merwe et al. | .... | 370/254 |
| 2008/0259798 A1* | 10/2008 | Loh et al. | ...................... | 370/235 |
| 2009/0103434 A1* | 4/2009 | Madsen et al. | ................. | 370/232 |
| 2009/0268612 A1* | 10/2009 | Felderman et al. | ........... | 370/230 |
| 2011/0141891 A1* | 6/2011 | So | .................. | 370/235 |
| 2012/0026876 A1* | 2/2012 | Babiarz | ....................... | 370/232 |

FOREIGN PATENT DOCUMENTS

EP        1653675 A1 *   5/2006   ............. H04L 12/55

* cited by examiner

*Primary Examiner* — Asad Nawaz
*Assistant Examiner* — Parth Patel (57) ABSTRACT

Aspects of the disclosure provide a method for packet load balancing. The method includes determining at an ingress node of a switching system that an initial packet belongs to a new packet flow going to an egress node of the switching system, determining real-time congestion status of a plurality of paths to the egress node based on received congestion information of nodes on the plurality of paths, and selecting a path from the plurality of paths for switching the initial packet and subsequent packets of the new packet flow based on the real-time congestion status.

22 Claims, 7 Drawing Sheets

SWITCH NODES EGRESS QUEUE DEPTH 610

LINK No. → 0 1 2 3 4 5 6 7
DESTINATION i →
DESTINATION j → A(0) A(1) A(2) A(3) A(4) A(5) A(6) A(7)
DESTINATION k →

FIG. 6A

SWITCH NODES SHARED BUFFER POOL FILL LEVEL

LINK No. → 0 1 2 3 4 5 6 7
B(0) B(1) B(2) B(3) B(4) B(5) B(6) B(7)    620

FIG. 6B

INGRESS NODE QUEUE DEPTH    630

LINK No. → 0 1 2 3 4 5 6 7
C(0) C(1) C(2) C(3) C(4) C(5) C(6) C(7)

FIG. 6C

CONGESTION STATUS (LINK) = FUNCTION(A(LINK), B(LINK), C(LINK))

METHOD AND APPARATUS FOR ADAPTIVE PACKET LOAD BALANCING

INCORPORATION BY REFERENCE

This application claims the benefit of U.S. Provisional Application No. 61/331,530, filed on May 5, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A data center can use a flattened architecture to increase data accessibility and save cost for a very high-speed core switch. In a two-tier example, a first top-of-rack (TOR) switch and a second TOR switch are both coupled to the same aggregation switches. Thus, the first TOR switch can transmit packets to the second TOR switch via any of the aggregation switches.

SUMMARY

Aspects of the disclosure provide method and apparatus for adaptive packet load balancing. A method for load balancing includes determining at an ingress node of a switching system that an initial packet belongs to a new packet flow going to an egress node of the switching system, determining real-time congestion status of a plurality of paths to the egress node based on received congestion information of nodes on the plurality of paths, and selecting a path from the plurality of paths for switching the initial packet and subsequent packets of the new packet flow from the ingress node to the egress node based on the real-time congestion status.

Further, the method includes selecting a least loaded path from the plurality of paths for switching the new packet flow based on the real-time congestion status. In an embodiment, the method includes maintaining an assignment of the selected path to the new packet flow, and driving the initial packet and the subsequent packets belonging to the new packet flow onto the path assigned to the new packet flow.

To maintain the assignment of the selected path to the new packet flow, the method includes canceling the assignment when the new packet flow terminates, or canceling the assignment when the new packet flow is idle for a time that is longer than a threshold.

According to an aspect of the disclosure, the method includes receiving queue and buffer information of the nodes on the plurality of paths that is indicative of the congestion information of the nodes. In an example, the method includes receiving queue and buffer fill levels and fill rates of the nodes on the plurality of paths. Then, the method includes determining the real-time congestion status based on the queue and buffer information on the plurality of paths using a proportional-integral-derivative technique.

Aspects of the disclosure provide an integrated circuit for use in an ingress node of a switching system. The integrated circuit includes a monitoring module, and a load balancing module. The monitor module is configured to receive and monitor congestion information of nodes in the switching system. The load balancing module is configured to determine that an initial packet going to an egress of the switching system belongs to a new packet flow, determine real-time congestion status of a plurality of paths to the egress node based on the received congestion information of nodes on the plurality of paths, and select a path from the plurality of paths based on the real-time congestion status of the plurality of paths for switching the initial packet and subsequent packets belonging to the new packet flow.

In an embodiment, the load balancing module includes a flow generator configured to determine that the initial packet belongs to the new packet flow going to the egress node, a path resolution module configured to determine the real-time congestion status of the plurality of paths based on the congestion information of the nodes on the plurality of paths, and a link determination module configured to select a least loaded path from the plurality of paths based on the real-time congestion status.

Further, in an example, the link determination module is configured to maintain an assignment of the selected path to the new packet flow, and use the path assigned to the new packet flow to switch the subsequent packets belonging to the new packet flow. For example, the link determination module includes a flow table configured to maintain the assignment of the selected path to the new packet flow. The flow table is further configured to cancel the assignment when the new packet flow terminates, or when the new packet flow is idle for a time that is longer than a threshold.

In an embodiment, the integrated circuit includes I/O ports in association with the plurality of paths. The I/O ports are configured to receive the congestion information of the nodes in the switching system. For example, the I/O ports are configured to receive queue and buffer information of the nodes in the switching system. Then, the monitoring module is configured to keep track of the received queue and buffer information of the other nodes, and the queue information of the I/O ports.

Aspects of the disclosure also provide an apparatus for use in a switching system. The apparatus includes first I/O ports configured to receive packets coming into the switching system for switching, second I/O ports configured to drive packets to different paths in the switching system, a monitoring module configured to receive and monitor congestion information of nodes in the switching system, and a load balancing module. The load balancing module is configured to determine that an initial packet going to an egress node of the switching system belongs to a new packet flow, determine real-time congestion status of a plurality of paths to the egress node based on the received congestion information of nodes on the plurality of paths, and select a path from the plurality of paths based on the real-time congestion status of the plurality of paths for switching the initial packet and subsequent packets belonging to the new packet flow.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
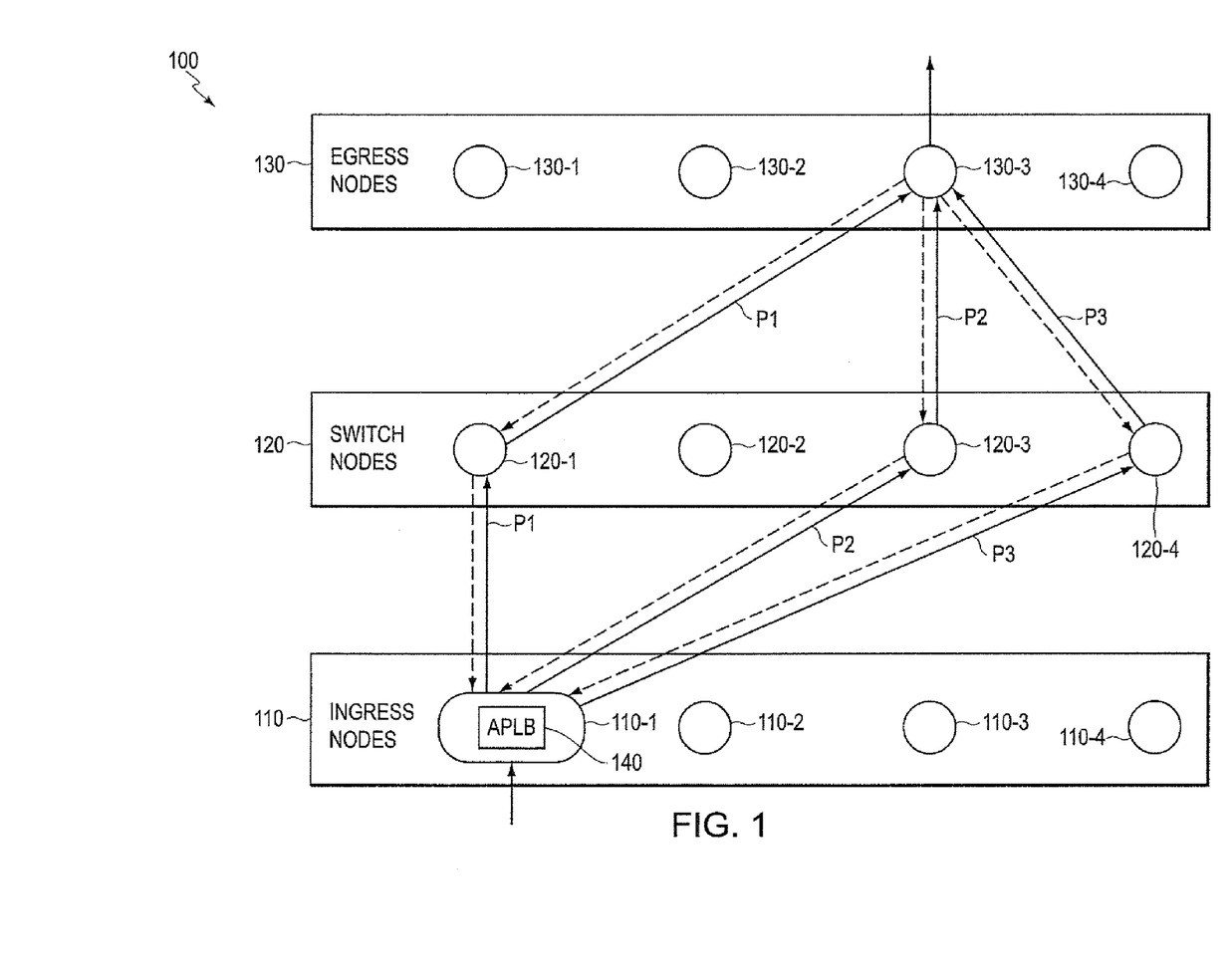
FIG. 1 shows a block diagram of a switching system example 100 according to an embodiment of the disclosure.

FIG. 1 shows a block diagram of a switching system example 100 according to an embodiment of the disclosure. The switching system 100 includes ingress nodes 110 that receive packets for switching, egress nodes 130 that output the suitably switched packets, and switch nodes 120 that are suitably coupled to the ingress nodes 110 and the egress nodes 130 to form paths to direct packets from the ingress nodes 110 to the egress nodes 130. At least one ingress node, such as the ingress node 110-1, has multiple paths to an egress node, such as P1-P3 to the egress node 130-3. The ingress node 110-1 has an adaptive packet load balancing (APLB) module 140 that directs a packet flow going to the egress node 130-3 onto one of the multiple paths P1-P3, based on real-time congestion statuses of the multiple paths P1-P3.

According to an embodiment of the disclosure, nodes along the multiple paths P1-P3 are configured to send back information to the ingress node 110-1. The information is indicative of real-time congestions along the paths. Various types of information can be sent back, such as queue depth, queue fill rate, buffer depth, buffer fill rate, packet waiting time, and the like.

In another embodiment, the switch nodes 120 and the egress nodes 130 determine congestion information, such as types of congestion, levels of congestion, and suitably send the congestion information to the ingress nodes 110. In an example, when the switch node 120-1 determines an ingress congestion that the number of packets buffered at the switch node 120-1 for switching is larger than a threshold, the switch node 120-1 sends the ingress congestion information to the ingress nodes 110 that are linked to switch node 120-1. When the switch node 120-1 determines an egress congestion that a fill level of a transmission queue for queuing packets for transmitting to a specific egress node is higher than a threshold, the switch node 120-1 broadcasts the egress congestion information to the ingress nodes 110 to inform congestion at the specific egress node.

The APLB module 140 in the ingress node 110-1 monitors the information sent back from the multiple paths P1-P3. In an embodiment, the APLB module 140 determines a real-time congestion status for each of the multiple paths P1-P3 based on the monitored information. The APLB module 140 can use any suitable algorithm to determine the real-time congestion status based on the monitored information. In an example, the APLB module 140 determines the real-time congestion status for each of the multiple paths P1-P3 according to a proportional-integral-derivative (PID) control technique.

Further, the APLB module 140 selects one of the multiple paths P1-P3 based on the real-time congestion statuses of the multiple paths P1-P3, and assigns the selected path to a packet flow for directing the packet flow from the ingress node 110-1 to the egress node 130-3. For example, the APLB module 140 selects and assigns a least loaded path for a packet flow. It is noted that, in an embodiment, a packet flow is referred to as a stream of packets, such as TCP/IP packets, and the like, coming from a particular source addresses (SA) (e.g. a source server) and source port (e.g., a port of the source server) and going to a particular destination address (DA) (e.g., a destination server) and destination port (e.g., a port of the destination server). It is noted that the packet flow can be a single packet, or a sequence of ordered packets.

According to an aspect of the disclosure, an ingress node and an egress node can be suitably implemented in one single electronic device of the switching system 100. In an example, a first electronic device is configured to serve as both the ingress node 110-1 and the egress node 130-1, a second electronic device is configured to serve as both the ingress node 110-2 and the egress node 130-2, a third electronic device is configured to serve as both the ingress node 110-3 and the egress node 130-4, and a fourth electronic device is configured to serve as both the ingress node 110-4 and the egress node 130-4.

Further, the switching system 100 can be implemented at various scales. In an example, the switching system 100 is a data center. The ingress nodes 110 and the egress nodes 130 are top of rack (TOR) switches that are coupled to various servers, drives, central processing unit (CPU), and the like, and the switch nodes 120 are aggregation switches.

In another example, the switching system 100 is implemented in a chassis. The ingress nodes 110 and the egress nodes 130 are implemented as line cards, and the switch nodes 120 are implemented as fabric cards. Each of the line cards and the fabric cards includes one or more integrated circuits. In an example, a line card and a fabric card include same integrated circuits. The integrated circuits in the line card are configured to perform the functions of the line card, and the integrated circuits in the fabric card are configured to perform the functions of the fabric card.

It is noted that, in an embodiment, the switching system 100 is a single stage switching system that has a single stage of switch nodes, such that each path from an ingress node to an egress node includes one switch node. In another embodiment, the switching system 100 is a multiple-stage switching system that has multiple stages of switch nodes, such that each path from an ingress node to an egress node includes multiple switch nodes.

Figure 2:
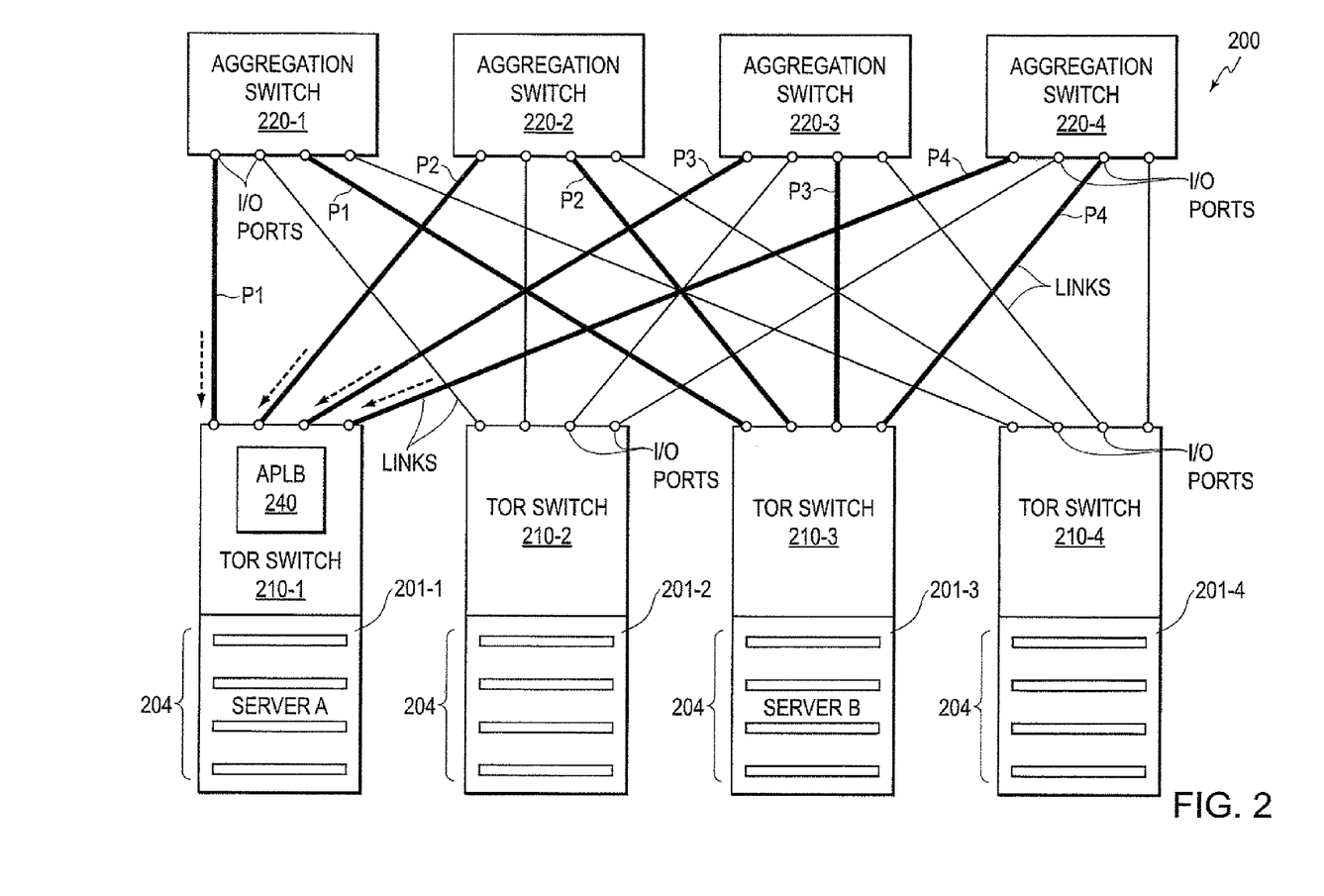
FIG. 2 shows a block diagram of a data center example 200 according to an embodiment of the disclosure.

FIG. 2 shows a block diagram of a data center example 200 according to an embodiment of the disclosure. The data center 200 includes various servers 204 that are capable of performing various types of data operations, such as storage, delivering email, streaming data, searching, and the like. The various servers 204 are installed on racks 201-1 to 201-4. Each of the racks 201-1 to 201-4 includes a top of rack (TOR) switch, as shown by TOR switches 210-1 to 210-4. Each of the TOR switches 210-1 to 210-4 includes first I/O ports (not shown) that are coupled to the servers installed on the corresponding rack. Further, each of the TOR switches 210-1 to 210-4 includes second I/O ports that are coupled to multiple aggregation switches 220 via any suitable links, such as multiple twisted pair cable, coaxial cable, fiber optical cable, and the like. Thus, the data center 200 forms multiple paths between servers for packet switching.

For example, in FIG. 2, server A is installed on the rack 201-1, and server B is installed on the rack 201-3. The TOR switch 210-1 of the rack 201-1 includes an I/O port (not shown) linked to server A, and the TOR switch 210-3 of the rack 201-3 includes an I/O port (not shown) linked to server B. In FIG. 2 example, the data center 200 is configured in a single stage architecture, and has four aggregation switches 220-1 to 220-4. The TOR switches 210-1 to 210-4 are coupled to the four aggregation switches 220-1 to 220-4 via any suitable links in a full mesh that each TOR switch is respectively coupled to each of the aggregation switches. Thus, the data center 200 forms four paths P1 to P4 for switching packets from server A to server B.

In an example, path P1 includes an output portion of one of the second I/O ports in the TOR switch 210-1 (e.g., queues, a scheduler, driving circuits of the I/O port, etc.), a link between the TOR switch 210-1 and the aggregation switch 220-1, suitable portions of the aggregation switch 220-1 (e.g., receiving portion of an I/O port, shared buffer pool, an output portion of another I/O port, etc.), a link between the aggregation switch 220-1 and the TOR switch 210-3, and a receiving portion of the TOR switch 210-3. The paths P2, P3 and P4 include similar components. It is noted that, in the FIG. 2 example, each of the second I/O ports in the TOR switch 210-1 corresponds to a path to the TOR switch 210-3. It is further noted that, each of the second I/O ports in the switch 210-1 may also correspond to paths to other TOR switches, such as TOR switches 210-2 and 210-4.

According to an aspect of the disclosure, devices on the paths collect real-time congestion information along the paths and send the real-time congestion information to corresponding sources of the paths, such as corresponding TOR switches 210 in the FIG. 2 example. When a source sends a packet flow, the source can select a path, such as a least loaded path, based on the received real-time congestion information, for transmitting the packet flow. In an example, when server A sends a packet flow to server B, the TOR switch 210-1 selects one of the four paths P1 to P4 based on real-time congestion statuses of the four paths for transmitting the packet flow to server B.

In an embodiment, the TOR switch 210-1 includes an APLB module 240 configured to monitor real-time congestion information in the data center 200, determine congestion statuses for paths to a destination, such as P1-P4 to the TOR switch 210-3, and select a path for a new packet flow to the destination based on the congestion statuses. In an example, the APLB module 240 monitors real-time congestion information in the data center 200, determines congestion statuses of the four paths P1-P4 from the TOR switch 210-1 to the TOR switch 210-3, and selects one of the four paths, such as a least loaded path, for a new packet flow based on the congestion statuses.

The APLB module 240 can be implemented using various techniques. In an example, the APLB module 240 is implemented as integrated circuits on an integrated circuit (IC) chip. In another example, the APLB module 240 is implemented as instruction codes stored in a storage medium. The instruction codes are executed by a processor to perform adaptive packet load balancing. It is also noted that, in another example, the APLB module 240 is implemented as a combination of integrated circuits and instruction codes.

According to an embodiment of the disclosure, the APLB module 240 includes one or more status tables to keep track of real-time information congestion of electronic devices in the data center 200 that are indicative of congestion, such as queue depth, queue fill rate, buffer pool fill level, buffer fill rate, packet waiting time, and the like of the aggregation switches 220-1 to 220-4, and real-time congestion information of the TOR switch 210-1 itself. In an example, the APLB module 240 includes an ingress node queue depth table that keeps track of queue depths of the second I/O ports of the TOR switch 210-1. In another example, the APLB module 240 includes a switch nodes transmission queue depth table to keep track of queue depths of the aggregation switches 220-1 to 220-4. In an example, based on the real-time congestion information, the APLB module 240 calculates a value that is indicative of a congestion status for path, such as each of the P1-P4, according to a proportional-integral-derivative control technique. Then, when the TOR switch 210-1 receives a new packet flow going to server B, the APLB module 240 selects a path of the four paths P1-P4, such as a least congested path, based on the values for the paths, and uses the selected path to transmit the packet flow.

Figure 3:
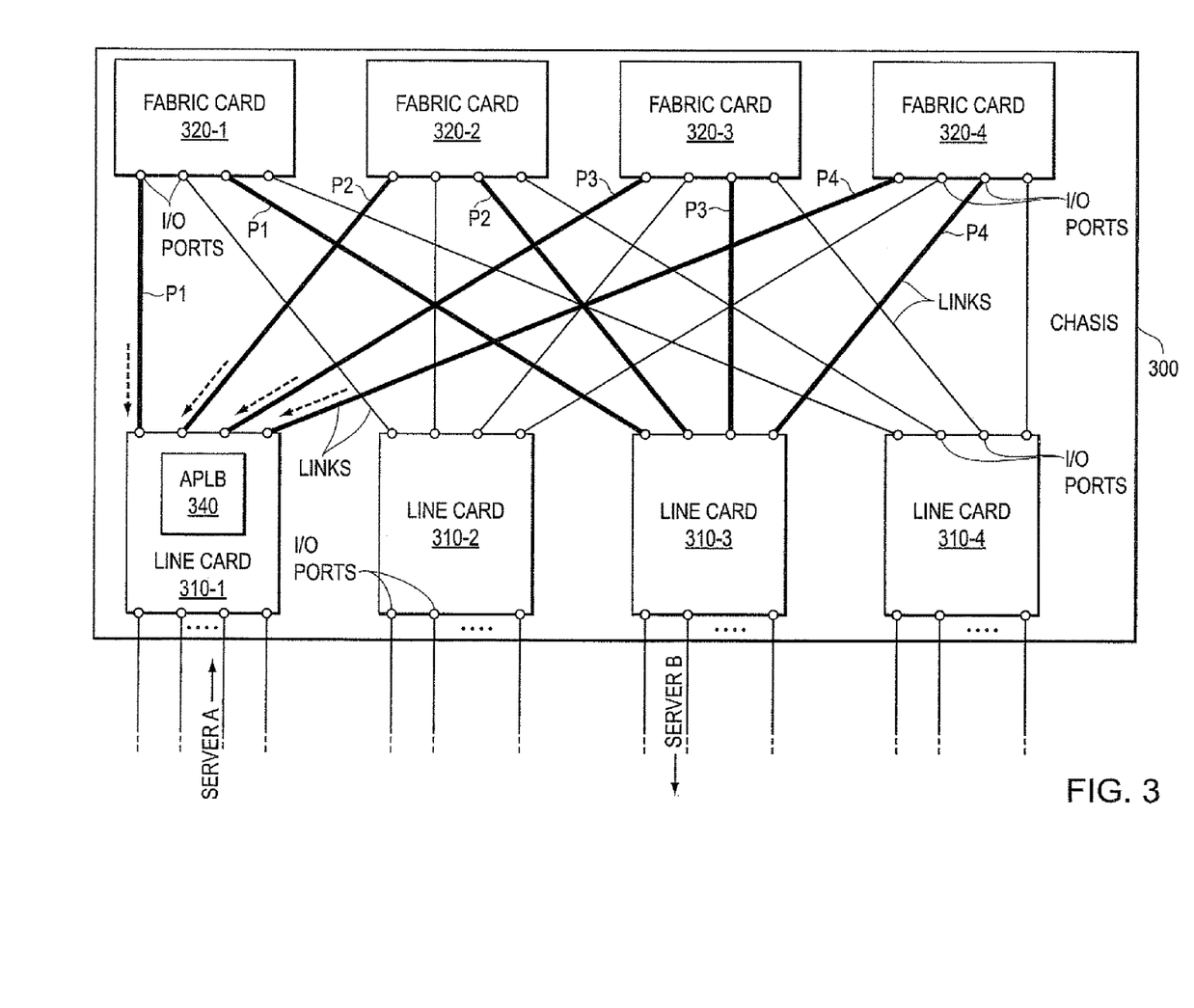
FIG. 3 shows a block diagram of a chassis example 300 according to an embodiment of the disclosure.

FIG. 3 shows a block diagram of a chassis example 300 according to an embodiment of the disclosure. The chassis 300 includes line cards 310, and fabric cards 320. Each of the line cards 310 includes first input/output (I/O) ports that are suitably coupled with various servers, and second I/O ports that are suitably coupled to I/O ports of the fabric cards 320. Thus, the chassis 300 forms multiple paths between servers for packet switching.

For example, in FIG. 3, the line card 310-1 includes an I/O port linked to server A, and the line card 310-3 includes an I/O port linked to server B. In FIG. 3 example, the chassis 300 is configured in a single-stage architecture, and has four fabric cards 320-1 to 320-4. The line cards 310-1 to 310-4 are coupled to the four fabric cards 320-1 to 320-4 via any suitable links in a full mesh that each line card is respectively coupled to each of the fabric cards. Thus, the chassis 300 forms four paths P1 to P4 for switching packets from server A to server B.

In an example, path P1 includes an output portion of one of the second I/O ports in the line card 310-1 (e.g., queues, a scheduler, driving circuits of the I/O port, etc.), a link between the line card 310-1 and the fabric card 320-1, suitable portions of the fabric card 320-1 (e.g., receiving portion of an I/O port, shared buffer pool, an output portion of another I/O port, etc.), a link between the fabric card 320-1 and the line card 310-3, and a receiving portion of the line card 310-3. Paths P2, P3 and P4 include similar components. It is noted that, in the FIG. 3 example, each of the second I/O ports in the line card 310-1 corresponds to a path to the line card 210-3. It is further noted that, each of the second I/O ports in the line card 310-1 may also correspond to paths to other line cards, such as line cards 310-2 and 310-4.

According to an aspect of the disclosure, electronic devices on the paths collect real-time congestion information along the paths and send the real-time congestion information to corresponding sources of the paths, such as corresponding line cards 310 in the FIG. 3 example. When a source sends a packet flow to a destination, the source can determine congestion statuses for paths to the destination based on the real-time congestion information, select a path, such as a least loaded path, based on the congestion statuses, for transmitting the packet flow. In an example, when server A sends a packet flow to server B, the line card 310-1 determines congestion statues of paths P1 to P4 based on the real-time congestion information, selects one of the four paths P1 to P4 based on the congestion statuses for transmitting the packet flow to server B.

In an embodiment, the line card 310-1 includes an APLB module 340 configured to monitor real-time congestion information in the chassis 300, determines congestion statuses for paths to a destination based on the real-time congestion information, and selects a path for a new packet flow to the destination based on the congestion statuses. In an example, the APLB module 340 monitors real-time congestion information of the fabric cards 320-1 to 32-4, such as shared buffer pool fill depths and fill rates, transmission queue depths and fill rates, and the like, and the real-time congestion information of the line card 310-1, such as transmission queue depths, fill rates and the like. Then, the APLB calculates congestion statuses for the four paths P1-P4 to the line card 310-3 using the real-time congestion information. Based on the congestion statuses for the four paths P1-P4, the APLB module 340 selects one path, such as a least loaded path, for a new packet flow going to the line card 310-3.

The APLB module 340 can be implemented using various techniques, such as integrated circuits, instruction codes executable by a processor, a combination of integrated circuits and instruction codes, and the like.

It is noted that, the chassis 300 may be coupled to other chassis or other switches. In an embodiment, the chassis 300 is configured as a top-of-rack (TOR) switch. For example, the fabric cards 320 include first I/O ports that are coupled to the line cards 310, and second I/O ports (not shown) coupled to one or more aggregation switches. In an example, the second I/O ports have higher bandwidth than the first I/O ports. In another embodiment, the chassis 300 is configured as an aggregation switch that the line cards 310 are coupled to top-of-rack switches.

Figure 4:
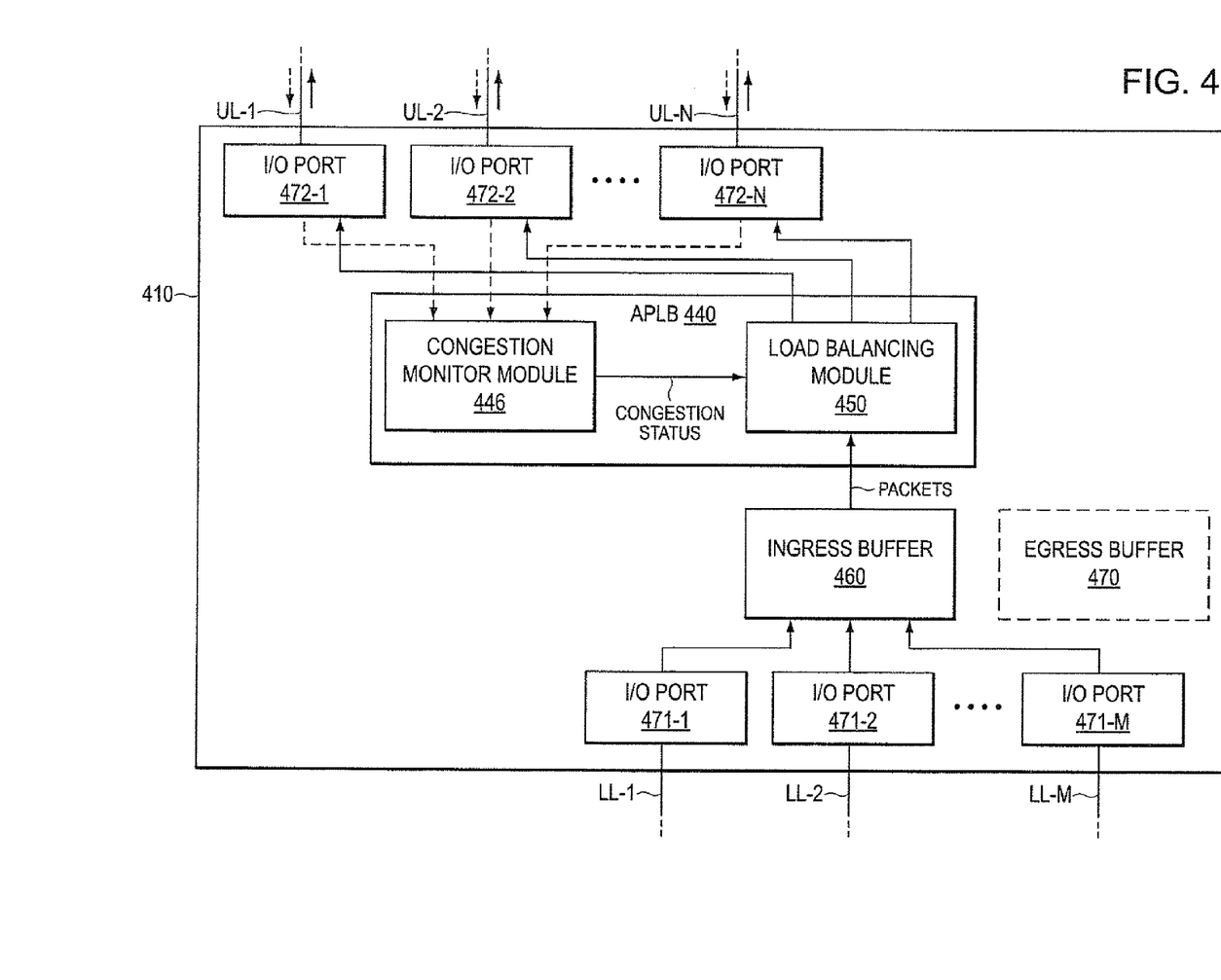
FIG. 4 shows a block diagram of an electronic device example 410 according to an embodiment of the disclosure.

FIG. 4 shows a block diagram of an electronic device example 410 according to an embodiment of the disclosure. In an embodiment, the electronic device 410 is configured as a source of packets in a switching system, such as an ingress node in the switching system 100. The electronic device 410 includes a first plurality of I/O ports 471-1 to 471-M (M is a positive integer number) coupled to lower level nodes (not shown), such as servers, lower level switches, and like, an ingress buffer 460 for buffering packets received from the lower level nodes for switching, a second plurality of I/O ports 472-1 to 472-N (N is a positive integer number) coupled to upper level nodes (not shown), such as aggregation switches, and the like, and an APLB module 440. In an embodiment, each of the second plurality of I/O ports 472-1 to 472-N corresponds to a path to a destination. The APLB module 440 is configured to direct a packet flow going to the destination to one of the second I/O ports 472-1 to 472-N based on real-time congestion information in the switching system. These elements are coupled together as shown in FIG. 4.

It is noted that, in an example, the electronic device 410 is configured as both an ingress node and an egress node in a switching system, such as a TOR switch in the data center 200, or a line card in the chassis 300. For example, the electronic device 410 includes an egress buffer 470 configured to buffer switched packets received from the second plurality of I/O ports, and provide each packet to a suitable port of the first plurality of I/O ports to direct the packet to its destination.

The first plurality of I/O ports 471-1 to 471-M are respectively coupled to lower level nodes, such as servers, lower level switches, and the like, via links LL-1 to LL-M. The first plurality of I/O ports 471-1 to 471-M include any suitable components for receiving packets from the lower level nodes for switching. The received packets are buffered in the ingress buffer 460. In an example, the ingress buffer 460 provides a received packet to the APLB module 440. The APLB module 440 forwards the received packet to an I/O port of the second I/O ports. In another example, the ingress buffer 460 provides a header of a received packet to the APLB module 440. When the APLB module 440 selects a path for the received packet, the received packet is forwarded from the ingress buffer 460 to an I/O port of the second I/O ports that corresponds to the selected path.

The second plurality of I/O ports 472-1 to 472-N are respectively coupled to upper level nodes, such as switch nodes, aggregation switches, fabric cards, and the like, via links UL-1 to UL-N. The second plurality of I/O ports 472-1 to 472-N includes suitable components to respectively drive packets for switching onto the links UL-1 to UL-N.

Each I/O port of the second plurality of I/O ports 472-1 to 472-N and the coupled link corresponds to paths to a destination egress node of the switching system. In a single stage switching system example, such as the data center 200 in FIG. 2 and the chassis 300 in FIG. 3, each I/O port of the second plurality of I/O ports 472-1 to 472-N is coupled to a different switch node enabled to direct packets to a specific egress node. Thus, each I/O port corresponds to a path to the specific egress node of the switching system, and there exist N paths from the electronic device 410 to the specific egress node. It is noted that, each of the second plurality of I/O ports also corresponds to paths to other egress nodes (not shown) of the switching system.

The second plurality of I/O ports 472-1 to 472-N include suitable components for driving packets onto the respectively coupled links. In an embodiment, each of the second plurality of I/O ports 472-1 to 472-N includes a plurality of queues (not shown) for queuing packets, and a scheduler (not shown). In an example, the plurality of queues is configured for queuing packets of different properties. In an example, a first queue is configured to queue packets of control messages, a second queue is configured to queue video stream packets, a third queue is configured to queue TCP packets of a first priority, a fourth queue is configured to queue TCP packets of a second priority, a fifth queue is configured to queue UDP packets, and the like. The scheduler is configured to schedule packets from the plurality of queues for driving to the coupled link. The scheduler can use any suitable algorithm, such as weighted round robin, smooth deficit weighted round robin, and the like.

In addition, in an embodiment, the second plurality of I/O ports 470-1 to 470-N includes suitable components to receive congestion information from the upper level nodes. In an example, an upper level node is configured to send available congestion information, such as congestion information the upper level node itself, congestion information of coupled egress nodes, and the like, back to coupled ingress nodes. The congestion information can include any suitable information, such as queue depths, queue fill rate, packet waiting time, buffer fill level, buffer fill rate, and the like, that is indicative of congestion.

The second plurality of I/O ports 472-1 to 472-N receives the congestion information back from the upper level nodes, and provides the congestion information to the APLB 440. In addition, the second plurality of I/O port 472-1 to 472-N also provides their congestion information, such as queue depths and queue fill rates of the second plurality of I/O ports 472-1 to 472-N, to the APLB 440.

The APLB 440 directs the received packets to the second plurality of I/O ports 472-1 to 472-N based on real-time congestion information in the switching system. In an embodiment, the APLB 440 includes a congestion monitor module 446 for keeping track of real-time congestion information of the switching system, and a load balancing module 450 configured to select a path for each packet based on the real-time congestion information of the switching system, and direct the packet to an I/O port corresponding to the selected path.

In an embodiment, the congestion module 446 includes one or more status tables for tracking various congestion information. In an example, the congestion module 446 includes a status table for keeping track of transmission queue statuses of the second plurality of I/O ports, a status table for keeping track of buffer status of the upper level nodes, a status table for keeping track of the transmission queue statuses of the upper level nodes, and the like.

In an embodiment, the load balancing module 450 determines a path for a packet based on a packet flow that the packet belongs to and the real-time congestion information of the switching system, and direct the packet to an I/O port corresponding to the determine path. In an example, a packet source sends packets to a packet destination in the form of a packet flow, such as a TCP flow, and the like. Packets in the packet flow are preferred to be in order. It is noted that, for packets that do not need to be received in order, each packet can be considered as a packet flow of a single packet.

In an embodiment, the load balancing module 450 keeps tracks of existing packet flows and paths assigned to the existing packet flows. For each packet for switching, when the packet belongs to an existing packet flow, the load balancing module 450 uses a path assigned to the existing packet flow to transmit the packet; when the packet belongs to a new packet flow, the load balancing module 450 selects a path based on the real-time congestion information of the switching system, assigns the path to the new packet flow, and uses the path to transmit packets belonging to the new packet flow.

Figure 5:
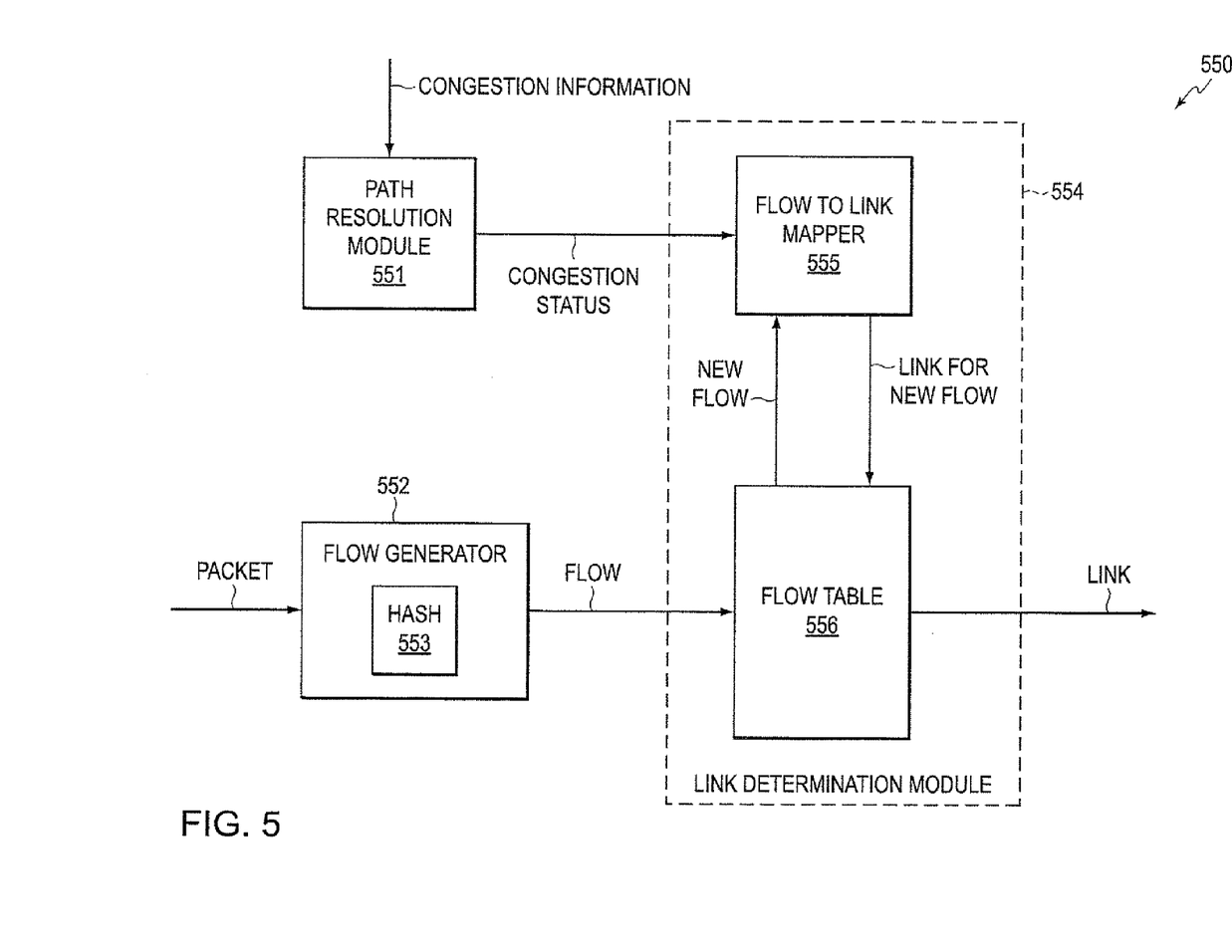
FIG. 5 shows a block diagram of a load balancing module example 550 according to an embodiment of the disclosure.

FIG. 5 shows a block diagram of a load balancing module example 550 according to an embodiment of the disclosure. The load-balancing module 550 is included in an electronic device in a switching system, such as the electronic device 410, to balance load based on real-time congestion information in the switching system. The load-balancing module 550 includes a flow generator 552, a path resolution module 551, and a link determination module 554. These elements are coupled together as shown in FIG. 5.

For each packet for switching, the flow generator 552 determines a packet flow that the packet belongs to. In an example, the flow generator 552 applies a hash function on suitable header fields of the packet to determine an identification of a packet flow that the packet belongs to.

The path resolution module 551 resolves congestion statuses for paths that can transmit a packet flow to its destination. In an example, the path resolution module 551 calculates values that are indicative of the congestion statuses for the paths based on the real-time congestion information. Based on the values, the path resolution module 551 provides a list of best paths to the link determination module 554.

The link determination module 554 determines a link for transmitting each received packet. In an embodiment, the link determination module 554 keeps track of existing packet flows and links in association with the existing packet flows. Then, the link termination module 554 determines whether a packet belongs to an existing packet or a new packet flow. When the packet belongs to an existing packet flow, the link determination module 554 selects the link in association with the existing packet flow to transmit the packet; when the packet belongs to a new packet flow, the link determination module 554 selects a link to transmit the new packet, and assigns the link to the new packet flow.

In an embodiment, the link determination module 554 includes a flow table 556, and a flow to link mapper 555. The flow table 556 keeps track of the existing packet flows. In an example, the flow table 556 is a sparse table with entries indexed by identifications of packet flows. Each entry includes information of a packet flow that can be used to mange the packet flow entry. For example, each entry includes bits to indicate whether a packet flow (having an identification that is the index of the entry) exists, which link is in association with the packet flow, and the like.

The flow table 556 includes suitable engines to manage the table entries, such as synchronizing an entry to a new packet flow, finishing an entry of a terminated packet flow, resetting an entry due to aging, and the like.

In an example, when a packet is a first packet in a packet flow. The flow identification hashed from the packet header points to an entry having bits that indicate no packet flow corresponding to this entry exists. The flow table 556 then synchronizes the entry to the packet flow. Specifically, the flow table 556 signals the flow to link mapper 555 that the packet belongs to a new packet flow. Then, the flow to link mapper 555 provides a link for the new packet flow. The link is determined based on real-time congestion information in the switching system. The flow table 556 stores the link in the entry and sets the entry to indicate that an existing packet flow corresponding to the entry exists.

In another example, when an existing packet flow is suitable terminated, the flow table 556 finishes an entry corresponding to the terminated packet flow. The flow table 556 clears the entry to indicate that no existing packet flow corresponds to this entry.

In another example, the flow table 556 regularly checks entries corresponding to existing packet flows. When an entry indicates a corresponding packet flow is idle that does not have activities for a relatively long time (e.g., longer than a packet travelling time in the switching system), the flow table 556 resets the entry to indicate that no existing packet flow corresponds to this entry.

In a scenario, a packet flow does not terminate in a regular way, thus the flow table 556 does not finish an entry corresponding to the terminated packet flow. The flow table 556 can reset the entry due to aging.

In another scenario, when a packet flow sends packets infrequently. The flow table 556 can reset an entry corresponding to the packet flow when the packet flow does not have activities for a relatively long time (e.g., longer than a packet travelling time in the switching system). Then, when a next packet of the packet flow comes, the flow table 556 then re-synchronizes the entry to the packet flow with a newly mapped path selected based on the real-time congestion information.

The flow to link mapper 555 maps new packet flows to links based on the congestion statuses of paths corresponding to the links. In an embodiment, the flow to link mapper 555 keeps track of paths information to destinations in the switching system. In an example, when the switching system is configured in a partial mesh, the flow to link mapper 555 includes a table to keep tracking of links or I/O ports corresponding to paths to a destination. When the flow to link mapper 555 receives a signal from the flow table 556 that a new packet flow goes to the destination, the flow to link mapper 555 determines paths to the destination, and receives congestion statuses of the paths from the path resolution module 551. Then, the flow to link mapper 555 allocates one of the links or I/O ports for the new packet flow based on the congestion statuses of the paths, and provides the link for the new packet flow to the flow table 556.

Figure 6A:
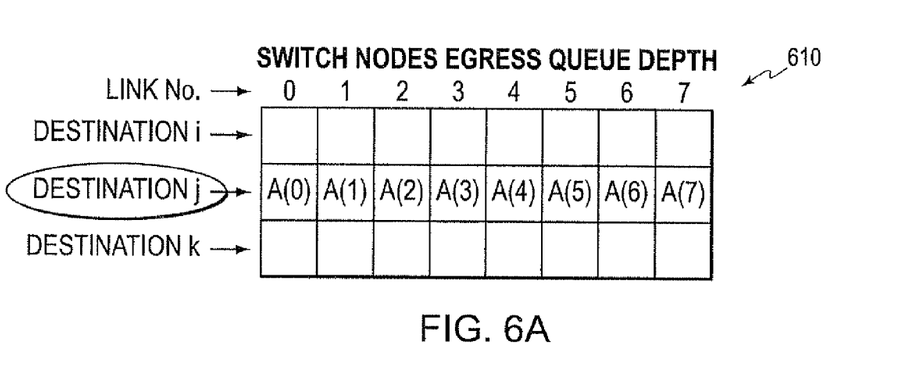
FIGS. 6A-6D shows an example of resolving congestion status for paths according to an embodiment of the disclosure.
Figure 6B:
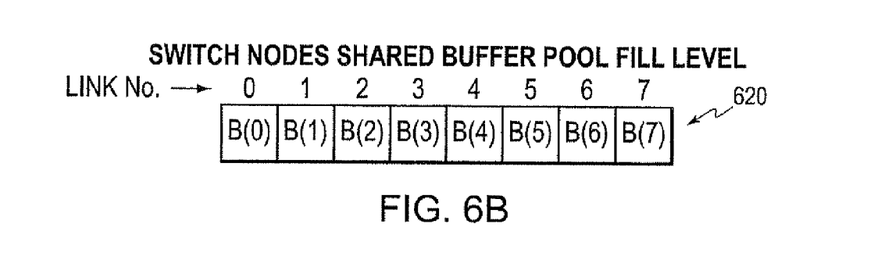
Figure 6C:
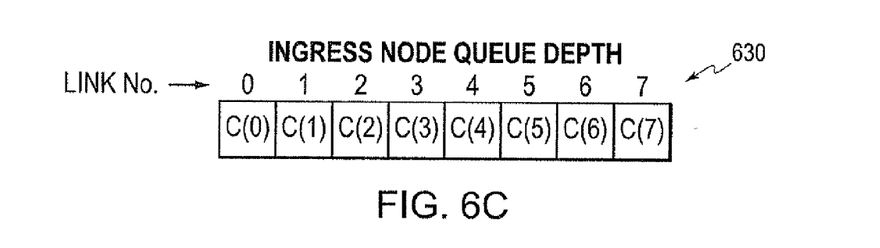

FIGS. 6A-6C shows status tables in an APLB module of an ingress node of a switching system, such as the APLB 440, for keeping track of real-time congestion information in the switching system according to an embodiment of the disclosure. In the embodiment, the switching system includes eight switch nodes. The ingress node includes eight I/O ports that are respectively coupled to the eight switch nodes via links (0 to 7). Thus, each link couples an I/O port of the ingress node to a switch node. For example, link 0 couples a first I/O port of the ingress node to a first switch node, link 1 couples a second I/O port of the ingress node to a second switch node, link 2 couples a third I/O port of the ingress node to a third node, and so on.

FIG. 6A shows a status table 610 for keeping track of switch nodes transmission queue depth. The status table 610 is a two-dimension matrix that includes a first dimension of links and a second dimension of destinations. It is noted that each link corresponds to a path to a destination. Each switch node includes I/O ports coupled to the destinations (e.g., egress nodes of the switching system), such as destination i, destination j, and destination k. The I/O ports of the switch nodes include transmission queues for queuing packets to the destinations. The status table 610 keeps track of the transmission queue depth of the switch nodes. For example, A(0) is a transmission queue depth of an I/O port of the first switch node to destination j; A(1) is a transmission queue depth of an I/O port of the second switch node to destination j; A(2) is a transmission queue depth of an I/O port of the third switch node to destination j, and so on.

FIG. 6B shows a status table 620 for keeping track of switch nodes buffer depth according to an embodiment of the disclosure. For example, B(0) is the buffer depth of a shared buffer pool (shared by ingress buffer and egress buffer) of the first switch node, B(1) is the buffer depth of shared buffer pool of the second switch node, B(2) is the buffer depth of a shared buffer pool of the third switch node, and so on.

FIG. 6C shows a status table 630 for keeping track of ingress node queue depth according to an embodiment of the disclosure. For example, C(0) is the transmission queue depth of the first I/O port of the ingress node, C(1) is the transmission queue depth of the second I/O port of the ingress node, C(2) is the transmission queue depth of the third I/O port of the ingress node.

Figure 6D:
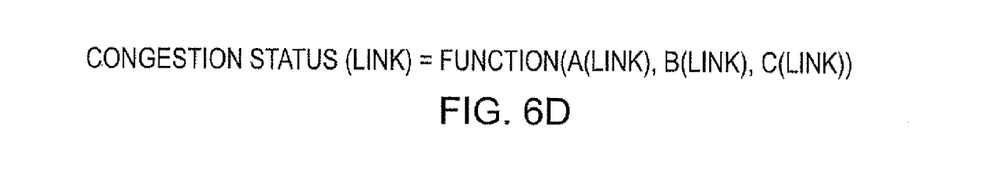

FIG. 6D shows a method to calculate congestion statuses of paths to destination j. In the example, each link corresponds to a path to destination j. It is noted that the congestion statuses can be calculated by any linear or non-linear functions. It is noted that the congestion statuses can be calculated based on any other suitable information, such as packets waiting time, queue fill rate, buffer fill rate, and the like.

Figure 7:
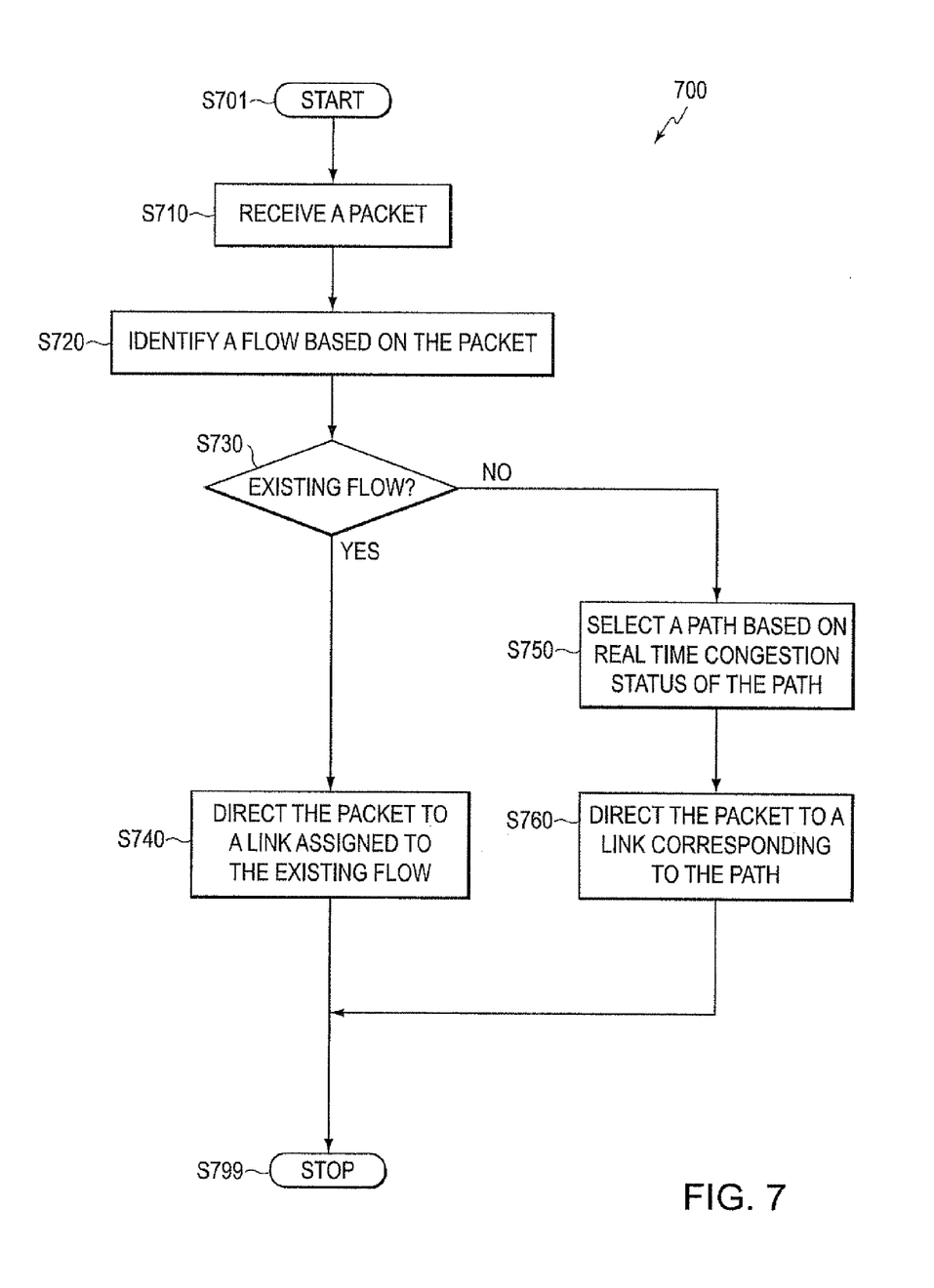
FIG. 7 shows a flow chart outlining a process example 700 for load balancing according to an embodiment of the disclosure.

FIG. 7 shows a flow chart outlining a process example 700 for an ingress node in a switching system to perform load balancing according to an embodiment of the disclosure. The process starts at S701 and proceeds to S710.

At S710, the ingress node receives a packet coming into the switching system switching to a destination.

At S720, the ingress node identifies a packet flow base don the packet. In an example, the ingress node includes a flow generator that uses a hash function on suitable portions of the packet header to generate an identification of the packet flow that the packet belongs to.

At S730, the ingress node determines whether the packet flow is an existing flow. In an embodiment, the ingress node includes a flow table that keeps track of existing packet flows. In an example, the flow table is a table with entries indexed by identifications of packet flows. Based on the identification of the packet flow, an entry is suitably located. The entry stores information for managing the packet flow, such as whether the packet flow is an existing packet flow, a link assigned to the corresponding packet flow, and the like. When the packet flow is an existing flow, the process proceeds to S740; otherwise, the process proceeds to S750.

At S740, the ingress node reads the link stored in the entry, and directs the packet to the link assigned to the existing packet flow. The process proceeds to S799 and terminates.

At S750, the ingress node selects a path based on real-time congestion status of the path. In an embodiment, the ingress node includes a congestion monitoring module configured to monitor real-time congestion information in the switching system. Further, the ingress node includes a path resolution module configured to determine congestion statuses of paths in the switching system that go to the destination. Then, the ingress node selects a path, such as a least loaded path based on the congestion status of the path, and assigns the path to the packet flow.

At S760, the ingress node directs the packet to a link corresponding to the path. In addition, the ingress node suitably maintains the assignment of the path to the packet flow, and directs subsequent packets belonging to the packet flow to the link. It is noted that, in an example, when the packet flow terminates, the ingress node cancels the assignment. In another example, when the packet flow is idle, the ingress node also cancels the assignment due to aging. Then, when the packet flow resumes active, the ingress node can select a new path based on the real-time congestion information in the switching system. The process proceeds to S799 and terminates.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for load balancing in a switching system including a plurality of ingress nodes, comprising: determining, at a first ingress node of the plurality of ingress nodes, that an initial packet belongs to a new packet flow going to an egress node of the switching system, wherein the first ingress node includes a plurality of I/O ports; receiving congestion information of nodes on a plurality of paths broadcast to the ingress nodes of the switching system, wherein the nodes on the plurality of paths include at least one intermediate node between the first ingress node and the egress node, the congestion information includes congestion information that originates from the at least one intermediate node and that is broadcast from the at least one intermediate node to the first ingress node, and the at least one intermediate node is a switch node configured to direct the initial packet and subsequent packets to the egress node; determining real-time congestion status of the plurality of paths for switching packets to the egress node in the switching system based on the congestion information of the nodes on the plurality of paths; and selecting, based on the real-time congestion status, a least loaded path from the plurality of paths for switching the initial packet and subsequent packets of the new packet flow from the first ingress node to the egress node, wherein the congestion information includes a transmission queue depth of the switch node, a buffer depth of the switch node, and queue depths of the plurality of I/O ports.

2. The method of claim 1, further comprising: maintaining an assignment of the selected least loaded path to the new packet flow; and driving the initial packet and the subsequent packets belonging to the new packet flow onto the path assigned to the new packet flow.

3. The method of claim 2, wherein maintaining the assignment of the selected least loaded path to the new packet flow further comprises: canceling the assignment when the new packet flow terminates; and canceling the assignment when the new packet flow is idle for a time that is longer than a threshold.

4. The method of claim 1, further comprising: receiving queue and buffer information of the nodes on the plurality of paths that is indicative of the congestion information of the nodes.

5. The method of claim 4, further comprising: receiving queue and buffer fill levels and fill rates of the nodes on the plurality of paths.

6. The method of claim 4, wherein determining the real-time congestion status of the plurality of paths further comprises: determining the real-time congestion status based on the queue and buffer information on the plurality of paths using a proportional-integral-derivative technique.

7. The method of claim 1, further comprising: directing the initial packet and subsequent packets of the new packet flow to a port of the first ingress node that is in association with the selected path.

8. The method of claim 1, wherein the congestion information, that originates from the at least one intermediate node and is broadcast from the intermediate node to the ingress node, includes egress congestion information.

9. The method of claim 1, wherein determining, at the first ingress node of the plurality of ingress nodes, that the initial packet belongs to the new packet flow includes determining whether an identification of the initial packet hashed from a header of the initial packet points to an entry in a flow table having bits that indicate no flow corresponding to the identification exits.

10. The method according to claim 1, wherein the first ingress node includes a second plurality of I/O ports coupled to a plurality of lower level nodes.

11. An integrated circuit for use in a first ingress node of a switching system including a plurality of ingress nodes, comprising: a monitoring module configured to receive and monitor congestion information of nodes on a plurality of paths in the switching system, the congestion information of the nodes on the plurality of paths being broadcasted to the ingress nodes in the switching system, wherein the nodes on the plurality of paths include at least one intermediate node between the first ingress node and the egress node, the congestion information includes congestion information that originates from the at least one intermediate node and that is broadcast from the at least one intermediate node to the first ingress node, the at least one intermediate node is a switch node configured to direct the initial packet and subsequent packets to the egress node, and the first ingress node includes a plurality of I/O ports; and a load balancing module configured to determine that an initial packet going to an egress node of the switching system belongs to a new packet flow, determine, based on the received congestion information of the nodes on the plurality of paths, real-time congestion status of the plurality of paths to the egress node, and select, based on the real-time congestion status of the plurality of paths, a least loaded path from the plurality of paths for switching the initial packet and subsequent packets belonging to the new packet flow, wherein the congestion information includes a transmission queue depth of the switch node, a buffer depth of the switch node, and queue depths of the plurality of I/O ports.

12. The integrated circuit of claim 11, wherein the load balancing module further comprises: a flow generator configured to determine that the initial packet belongs to the new packet flow going to the egress node; a path resolution module configured to determine the real-time congestion status of the plurality of paths for switching the new packet flow based on the congestion information of the nodes on the plurality of paths; and a link determination module configured to select the least loaded path from the plurality of paths based on the real-time congestion status.

13. The integrated circuit of claim 12, wherein the link determination module is configured to: maintain an assignment of the selected least loaded path to the new packet flow; and use the least loaded path assigned to the new packet flow to switch the subsequent packets belonging to the new packet flow.

14. The integrated circuit of claim 13, wherein the link determination module further comprises: a flow table configured to maintain the assignment of the selected least loaded path to the new packet flow.

15. The integrated circuit of claim 14, wherein the flow table is further configured to cancel the assignment when the new packet flow terminates, or when the new packet flow is idle for a time that is longer than a threshold.

16. The integrated circuit of claim 11, wherein the plurality of I/O ports include I/O ports in association with the plurality of paths configured to receive the congestion information of the nodes in the switching system.

17. The integrated circuit of claim 16, wherein the I/O ports in association with the plurality of paths are configured to receive queue and buffer information of other nodes in the switching system.

18. The integrated circuit of claim 17, wherein the monitoring module is configured to monitor the received queue and buffer information of the other nodes, and queue information of the I/O ports in association with the plurality of paths.

19. An apparatus for use in a switching system, comprising: first I/O ports configured to receive packets coming into the switching system for switching; second I/O ports configured to drive packets to different paths in the switching system; a monitoring module configured to receive and monitor congestion information of nodes on a plurality of paths in the switching system, the congestion information of the nodes on the plurality of paths being broadcasted to the second I/O ports of the switching system, wherein the nodes on the plurality of paths include at least one intermediate node between the second I/O nodes and an egress node, the congestion information includes congestion information that originates from the at least one intermediate node and that is broadcast from the at least one intermediate node to the second I/O nodes, and the at least one intermediate node is a switch node configured to direct the initial packet and subsequent packets to the egress node; and a load balancing module configured to determine that an initial packet going to the egress node of the switching system belongs to a new packet flow, determine, based on the received congestion information of the nodes on the plurality of paths, real-time congestion status of the plurality of paths to the egress node, and select, based on the real-time congestion status of the plurality of paths, a least loaded path from the plurality of paths for switching the initial packet and subsequent packets belonging to the new packet flow, wherein the congestion information includes a transmission queue depth of the switch node, a buffer depth of the switch node, and queue depths of at least one of the of first I/O ports and the second I/O ports.

20. The apparatus of claim 19, wherein the load balancing module further comprises: a flow generator configured to determine that the initial packet belongs to the new packet flow going to the egress node; a path resolution module configured to determine the real-time congestion status of the plurality of paths based on the received congestion information of nodes on the plurality of paths; and a link determination module configured to select the least loaded path from the plurality of paths based on the real-time congestion status.

21. The apparatus of claim 20, wherein the link determination module is configured to maintain an assignment of the selected least loaded path to the new packet flow, and use the least loaded path assigned to the new packet flow to switch the subsequent packets belonging to the new packet flow.

22. The apparatus of claim 21, wherein the link determination module further comprises: a flow table configured to maintain the assignment of the selected least loaded path to the new packet flow, and cancel the assignment when the new packet flow terminates, or when the new packet flow is idle for a time that is longer than a threshold.

* * * * *